F. H. SUMMERIL.
APPARATUS FOR TRANSMITTING POWER.
APPLICATION FILED MAR. 26, 1910.
990,171.
Patented Apr. 18, 1911.
3 SHEETS—SHEET 2.
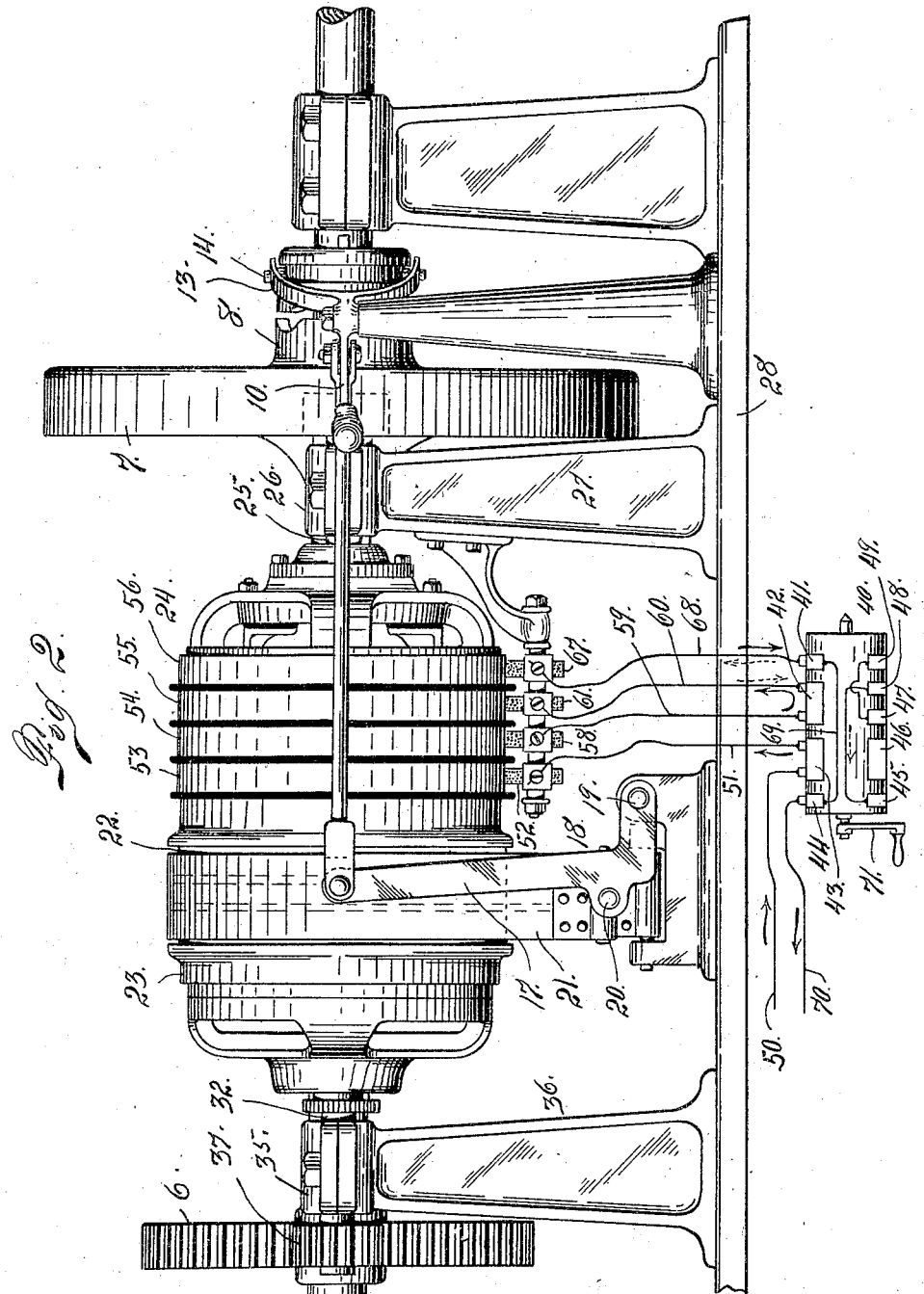

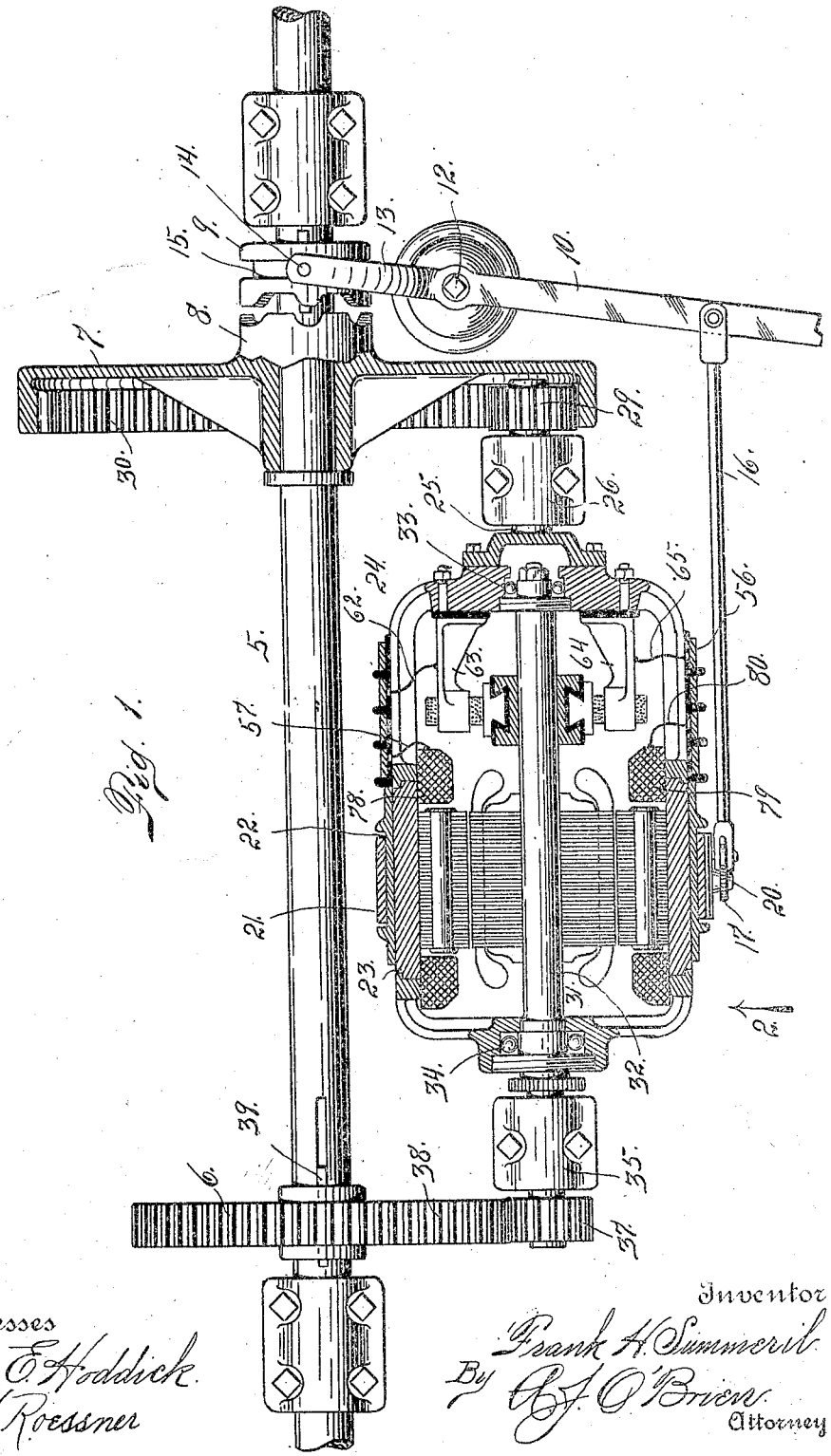

F. H. SUMMERIL.
APPARATUS FOR TRANSMITTING POWER.
APPLICATION FILED MAR. 26, 1910.
990,171.
Patented Apr. 18, 1911.
3 SHEETS—SHEET 3.
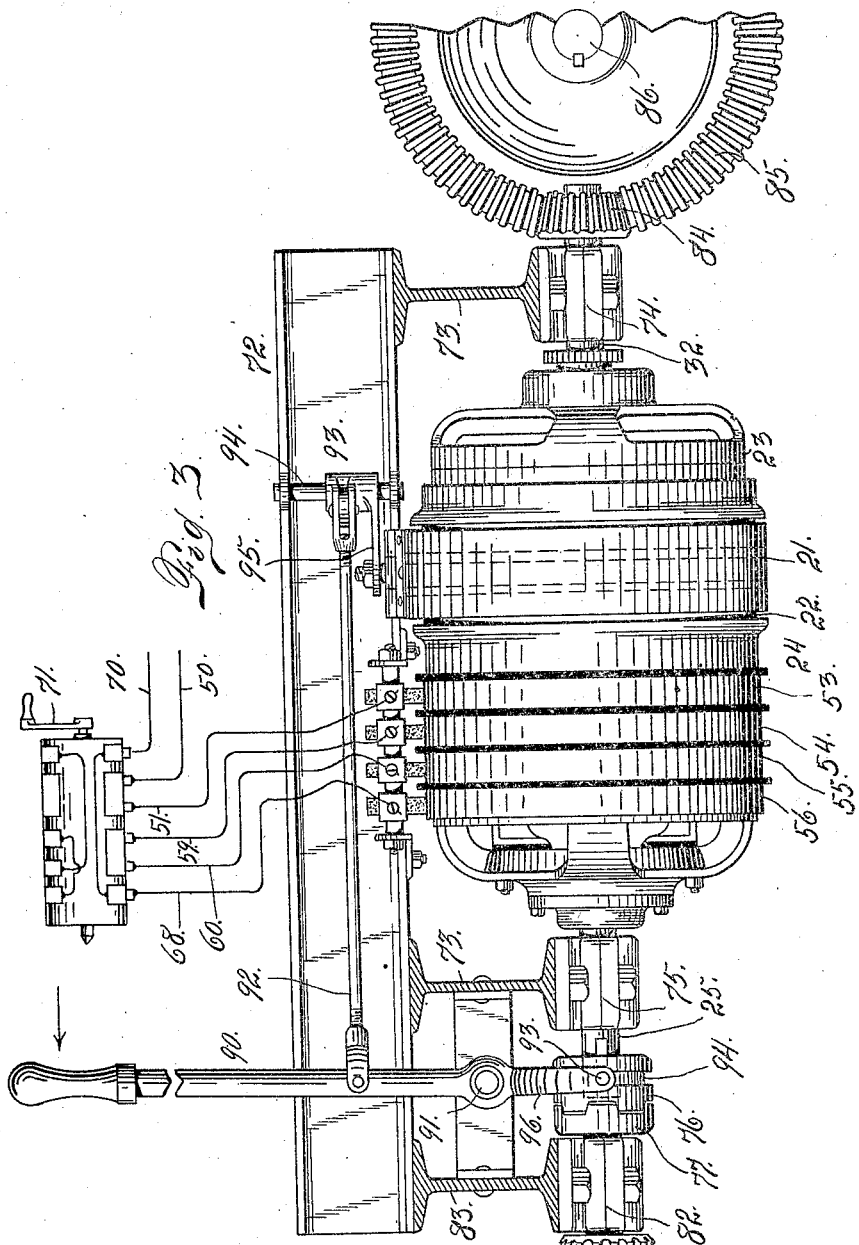

UNITED STATES PATENT OFFICE.

FRANK H. SUMMERIL, OF DENVER, COLORADO, ASSIGNOR TO THE UNIVERSAL MOTOR COMPANY, OF NEWCASTLE, INDIANA, A CORPORATION OF ARIZONA TERRITORY.

APPARATUS FOR TRANSMITTING POWER.

990,171. Specification of Letters Patent. Patented Apr. 18, 1911.

Application filed March 26, 1910. Serial No. 551,654.

*To all whom it may concern:*

Be it known that I, FRANK H. SUMMERIL, a citizen of the United States, residing in the city and county of Denver and State of Colorado, have invented certain new and useful Improvements in Apparatus for Transmitting Power; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

My invention relates to improvements in apparatus for transmitting power and involves the employment of a motor having two members arranged to rotate in reverse direction, the two members being directly connected with two gears mounted on a shaft to be rotated or with the truck of a vehicle, as a car, in such a manner that the oppositely rotating members coöperate to transmit motion to the shaft or the two sets of traction wheels in the same direction.

Provision is made for stopping one member of the motor whereby the other member will rotate at approximately double the speed. Hence, my improved construction may be utilized for changing the gear from a high to a low or vice versa.

While I prefer to employ an electric motor, it is evident that any motor having two members, mounted to rotate in reverse directions, may be employed.

Having briefly outlined my improved construction, I will proceed to describe the same in detail, reference being made to the accompanying drawing in which is illustrated an embodiment thereof.

In this drawing: Figure 1 is a top plan view showing a longitudinal section taken through a motor having its two oppositely rotating members connected to rotate a shaft in a given direction, the two motor members being respectively connected in operative relation with two gears mounted on the shaft to be rotated. Fig. 2 is a side elevation of the same. Fig. 3 is a side view showing a modified form of construction, in which the two oppositely rotating motor members are connected with gears fast on the two axles of a car-truck in such a manner that the two traction wheels of the axles are propelled in a given direction.

The same reference characters indicate the same parts in all the views.

Referring first to Figs. 1 and 2, let the numeral 5 designate a shaft to be rotated and upon which are mounted an exteriorly cogged wheel 6 and an interiorly cogged wheel 7. The wheel 6 is normally fast on the shaft, being splined thereon as shown at the left of Fig. 1. The gear 7 is normally loose on the shaft but may be connected to rotate therewith through the medium of two clutch members 8 and 9, the member 8 being formed integral with the wheel 7 while the member 9 is splined on the shaft and movable longitudinally into and out of engagement with the clutch member 8. When it is desired to cause the wheel 7 to rotate with the shaft, the two clutch members are thrown into engagement through the medium of a lever 10 fulcrumed at 12 and having a forked head 13 provided with pins 14 which enter a groove 15 formed in the clutch member 9 on opposite sides. By virtue of this connection the clutch member 9 is free to rotate with the shaft while the lever 10 remains stationary. The lever 10 is also connected by means of a rod 16 with one arm 17 of a lever 18, fulcrumed at 19 and connected as shown at 20 with a band-brake 21 engaging a zone 22 of the field member 23 of a motor 24. When it is desired to lock the field member against rotation, the lever 10 is shifted to the position shown in Fig. 1, whereby the clutch member 9 is interlocked with the clutch member 8 simultaneously with the locking of the field member of the motor against rotation. This field member 23 of the motor is provided at one extremity with a stub-shaft 25 journaled in a bearing 26 mounted on a standard 27 carried by a bed-plate. This stub-shaft is equipped with a pinion 29 meshing with the interior cogs 30 of the gear 7.

The armature member 31 of the motor includes a shaft 32 journaled by means of ball bearings 33 and 34, in the opposite extremities of the field member of the motor. This shaft is also journaled in a box 35 mounted on top of the standard 36 of the bed-plate 28. Adjacent the journal box 35 the armature shaft is equipped with a pinion 37 meshing with the exterior gears 38 of the gear wheel 6 which is splined on the shaft, as heretofore stated, and as shown at 39.

From the construction just described it will be understood that when the two motor members are rotating in reverse directions, the two oppositely rotating members, by virtue of their connection with the interiorly and exteriorly cogged gears on the same shaft, will operate the said shaft in a given direction. However, if it is desired to increase the speed of the shaft, as when the apparatus is carrying a light load, the field member of the motor may be locked by operating the band-brake, thus allowing the armature member to rotate at an increased speed.

The current enters the motor from a source of electricity (not shown), through a pole changer 40 having two sets of contacts, one set being designated 41, 42, 43 and 44, and the other set 45, 46, 47, 48 and 49. The current passes from one pole of the source through a conductor 50, to the contact 43, through a conductor 51 to a brush 52 which engages a contact ring 53 carried by the field member of the motor which is also equipped with other similar contact rings designated 54, 55 and 56, respectively. From the contact ring 53, the current passes through a conductor 57 to one set of coils 78 of the field member of the motor, and after finally passing through all of the said coils, it leaves a coil 79 through a conductor 80 to the contact ring 54, whence it passes through a brush 58, and a conductor 59 to the contact 42 of the pole changer and thence through a conductor 60 to a brush 61 and thence to a contact ring 55, whence it passes through a conductor 62 to a section 63 of the commutator, finally passing from the commutator section 64 through a conductor 65 to the contact ring 56, whence it passes through a brush 67 and a conductor 68 to the contact 41 of the pole changer, and thence through a conductor 69 to the contact 44, and thence through a conductor 70 to the other pole of the electrical source.

When it is desired to reverse the motor or cause its rotating members to respectively rotate in reverse directions, the pole changer will be given a partial rotation through the instrumentality of the crank 71, in which event the current will enter and leave the motor as before, except that the travel of the current through the conductors 60 and 68 will be in reverse directions, as indicated by the dotted arrows adjacent the said conductors (see Fig. 2).

When the form of construction illustrated in Figs. 1 and 2 is in use, assuming that the field member, as well as the armature member of the motor, is free to rotate, the two motor members will revolve in reverse directions and their reversely rotating pinions 37 and 29 will rotate the gears 6 and 7 mounted on the same shaft in the same direction, by virtue of the fact that one pinion engages an exteriorly cogged gear while the other pinion engages an interiorly cogged gear. It will be understood that when both motor members are rotating, that the shaft to be rotated is given a relatively low speed and the low gear of the apparatus may be said to be employed. Now if it is desired to increase the speed of the shaft, the band-brake 21 is applied to the field member of the motor whereby the movement of the latter is stopped. Simultaneously with the setting of the brake, the clutch member 9 will be disconnected from the clutch member 8 of the wheel 7, thus allowing the shaft 5 to rotate in the gear 7 without turning the same. This is necessary since the field member of the motor is locked against movement and the pinion 29 is fast on the stub-shaft of the said member, and meshes with the cogs of the gears 7.

In the form of construction shown in Fig. 3, the motor is suspended from the frame 72 by I-beams 73 carrying bearings 74 and 75 in which the armature shaft 32 and the stub-shaft 25 are respectively journaled. The stub-shaft rotates with the field member 23 of the motor the same as in the other form of construction. However, upon the stub-shaft 25 is splined a clutch member 76 engaging a clutch member 77 fast on a short shaft 81 journaled in a bearing 82 carried by a third I-beam 83.

The motor construction and the manner of supplying the same with current, is substantially the same as shown in Figs. 1 and 2, and it will therefore not be necessary to describe these features in detail in connection with Fig. 3.

Upon the armature shaft 32 is mounted and made fast a pinion 84 meshing with a gear 85 fast on an axle 86 which it may be assumed is the axle of a car carrying traction wheels. The short shaft 81 is also equipped with a pinion 87 meshing with a gear 88 fast on an axle 89 which it may also be assumed is a car axle carrying traction wheels in the same manner as the axle 86. Furthermore, it may be assumed that the reversely rotating motor members are utilized to operate the truck of a car, the connections being such that the reversely revolving members coöperate to drive the truck in the same direction. Now if it is desired to lock the field member of the motor against rotation, a lever 90 fulcrumed at 91 and having a forked end 96 provided with pins 93 engaging a groove 94 in the clutch member 76, is operated, to disconnect the clutch member 76 from the corresponding member 77. At the same time the band-brake 21 is applied to the field member of the motor, which is locked against rotation, through the instrumentality of a rod 92 connecting the lever 90 with a lever 93 fulcrumed on a spindle 94 and connected in operative relation with the band-brake by an arm 95 formed integral with the lever 93. In this event the connection between the shafts 25 and 81 will be broken, and the axle 89 will be free to rotate independently of the field member of the motor which is locked against rotation. This construction is evidently necessary since it would not be practicable to lock the axle 89 and its traction wheels against rotation; but by breaking the connection between the two shafts 25 and 81 when the field member is locked against movement, all difficulty is overcome. When it is again desired to allow the field member of the motor to rotate, the clutch members 76 and 77 are again connected by the operation of the lever 90, and the band-brake 21 is simultaneously released.

Having thus described my invention, what I claim is:

1. The combination with a car truck to be operated, of means for operating the same, comprising gear wheels respectively mounted on the truck axles, a motor having two members mounted to rotate in reverse directions, a direct connection between the respective members of the motor and the gears of the car truck, whereby when both motor members rotate they coöperate to impart motion to the truck in a given direction, means for locking one of the motor members against rotation, and an operative connection between the said means and one of the gear wheels mounted upon the axle, whereby as one motor member is locked against motion its connection with the truck is broken, substantially as described.

2. The combination with a vehicle truck to be operated, having a pair of axles, of gears fast on the respective axles of the truck, and a motor having two members mounted to rotate in reverse directions, and a gearing connection between the respective motor members and the gears of the truck, whereby the two motor members will coöperate to impart motion to the truck in a given direction, means for locking one of the motor members against rotation, and means for simultaneously breaking the connection of the said member with the truck, with the locking of the said member against rotation, substantially as described.

3. The combination with a vehicle truck having two members arranged to rotate in reverse directions, of a gearing connection between both motor members and the truck whereby the reversely rotating motor members coöperate to drive the truck in a given direction, a brake for locking one of the motor members against rotation, means for operating the brake, and an operative connection between the brake-operating means and the motor member acted on by the brake, whereby as the one motor member is locked against rotation, its connection with the truck is broken, substantially as described.

4. The combination with a vehicle truck to be operated, having a pair of axles, the two axles of the truck being respectively equipped with two gear wheels, of a motor having two members arranged to rotate in reverse directions, a connection between the respective motor members and the respective gears of the vehicle truck to be operated, and means for simultaneously locking one member of the motor against rotation, and breaking its connection with the truck, substantially as described.

5. The combination with a vehicle to be operated, having a pair of axles, the said axles being equipped with two gear wheels, of a motor having two members arranged to rotate in reverse directions, and a direct connection between the respective motor members and the respective gears of the vehicle axles, a brake for locking one of the motor members against rotation, means for operating the brake, and an operative connection between the brake operating means and one of the gear wheels of the axle, whereby as one motor member is locked against rotation its connection with the truck of the vehicle is simultaneously broken, substantially as described.

In testimony whereof I affix my signature in presence of two witnesses.

FRANK H. SUMMERIL.

Witnesses:
  VIRGINIA I. DAVIS,
  ELIZABETH BOWEN.